(12) United States Patent
De Coi

(10) Patent No.: US 11,506,768 B2
(45) Date of Patent: Nov. 22, 2022

(54) TOF CAMERA DEVICE FOR ERROR DETECTION

(71) Applicant: ESPROS Photonics AG, Sargans (CH)

(72) Inventor: Beat De Coi, Maienfeld (CH)

(73) Assignee: ESPROS Photonics AG, Sargans (CH)

( * ) Notice: Subject to any disclaimer, the term of this patent is extended or adjusted under 35 U.S.C. 154(b) by 960 days.

(21) Appl. No.: 16/269,865

(22) Filed: Feb. 7, 2019

(65) Prior Publication Data

US 2019/0257929 A1 Aug. 22, 2019

(30) Foreign Application Priority Data

Feb. 20, 2018 (EP) ..................................... 18157644

(51) Int. Cl.
| | | |
|---|---|---|
| *G01S 7/497* | (2006.01) | |
| *G01S 17/10* | (2020.01) | |
| *G01S 13/32* | (2006.01) | |
| *G01S 7/4914* | (2020.01) | |
| *G01S 17/894* | (2020.01) | |
| *H04N 5/367* | (2011.01) | |

(52) U.S. Cl.
CPC ............ *G01S 7/497* (2013.01); *G01S 7/4914* (2013.01); *G01S 13/32* (2013.01); *G01S 17/10* (2013.01); *G01S 17/894* (2020.01); *H04N 5/3675* (2013.01)

(58) Field of Classification Search
CPC ...... G01S 7/4914; G01S 7/4915; G01S 7/497; G01S 7/4972; G01S 7/4975; G01S 17/894; G01S 17/10; G01C 3/00; H04N 5/3651; H04N 5/3675; H04N 17/002
See application file for complete search history.

(56) References Cited

U.S. PATENT DOCUMENTS 4,560,271 A * 12/1985 Fumio ..................... G01S 17/36
356/5.15
7,710,548 B2 * 5/2010 Braune ................... G01S 7/497
356/5.15
(Continued)

FOREIGN PATENT DOCUMENTS

DE 10 2007 008 806 B3 2/2008
EP 2 453 426 B1 7/2004
(Continued)

*Primary Examiner* — Luke D Ratcliffe
(74) *Attorney, Agent, or Firm* — Burr & Brown, PLLC

(57) ABSTRACT

A TOF camera apparatus for transmitting light signals and recording the light that is scattered back at an object and also for determining the distance of the TOF camera apparatus from the object is proposed, wherein the TOF camera apparatus comprises: a transmitter for transmitting light signals, a receiver for detecting the light scattered back at the object, embodied in the form of a pixel matrix having at least one pixel, a modulation device for producing a modulation signal in order to modulate light signals that are to be transmitted by the transmitter, an evaluation device for evaluating the light detected by the receiver, which evaluation device is connected to the modulation device to obtain the modulation signal for evaluating and determining the distance. In order to make possible particularly reliable error detection, a check apparatus for error detection in at least one of the pixels is provided.

18 Claims, 3 Drawing Sheets

(56) References Cited

U.S. PATENT DOCUMENTS

| | | | |
|---|---|---|---|
| 7,796,172 B1* | 9/2010 | Slagle | H04N 5/367 |
| | | | 348/312 |
| 9,712,768 B2* | 7/2017 | Tani | H04N 17/002 |
| 2005/0110976 A1 | 5/2005 | LaBelle | |
| 2006/0228050 A1* | 10/2006 | Xu | G01S 7/497 |
| | | | 250/201.1 |
| 2010/0265336 A1 | 10/2010 | Sorensen et al. | |
| 2012/0150480 A1 | 6/2012 | De Coi et al. | |
| 2013/0293724 A1* | 11/2013 | Martinussen | H04N 17/002 |
| | | | 348/175 |
| 2014/0094993 A1* | 4/2014 | Johnson | H04N 17/002 |
| | | | 701/1 |
| 2014/0268290 A1* | 9/2014 | Sebastian | G01S 7/497 |
| | | | 359/279 |
| 2016/0061941 A1* | 3/2016 | Guo | G01S 17/894 |
| | | | 356/4.02 |
| 2019/0011558 A1* | 1/2019 | Crouch | G08G 1/16 |

FOREIGN PATENT DOCUMENTS

| | | |
|---|---|---|
| KR | 2017-0127865 A | 11/2017 |
| WO | 2004/055544 A1 | 7/2004 |
| WO | 2006/044773 A2 | 4/2006 |

\* cited by examiner

TOF CAMERA DEVICE FOR ERROR DETECTION

FIELD OF THE INVENTION

The present invention relates to a TOF camera apparatus and to a method for error detection in at least one pixel.

BACKGROUND OF THE INVENTION

Optical monitoring systems such as TOF camera apparatuses have been used in the prior art for numerous safety-relevant applications, for example, for door monitoring, in particular, in the case of motor-driven or automatically opening or closing door systems such as automated entrance doors, garage doors, elevator doors or the like, all the way to driver assistance systems in vehicles or robots or other control systems for autonomous driving. Error-free operation of corresponding TOF camera apparatuses is of major importance especially in the aforementioned areas to be able to avoid accidents, injury to persons or damage to objects. The prior art, for example, EP 2 453 426 B1, discloses a monitoring apparatus having a TOF sensor, which upon initialization tests itself and, if required, performs a plausibility check so as to be able to avoid errors.

SUMMARY OF THE INVENTION

It is the object of the present invention to be able to provide a TOF camera apparatus which can also offer the highest possible degree of safety especially in the context of safety-relevant applications.

The TOF camera apparatus within the meaning of the present invention serves for transmitting light signals and recording the light that is scattered back at an object, and also for determining the distance of the TOF camera apparatus from the object. The abbreviation "TOF" stands for the term "time of flight," which means it is a type of propagation time measurement. A corresponding TOF camera apparatus comprises a transmitter, which is used to transmit the light signals, and a receiver, which is used to detect the light that is scattered back at an object. In this way, it is possible to determine the distance between the camera apparatus and the object by way of performing a type of propagation time measurement. Such a propagation time measurement can be performed, for example, by determining a phase shift between a transmitted signal and a detected signal. It is also possible instead to perform a time measurement on a transmitted pulse (for example, in the case of pTOF or LIDAR). For this purpose, a corresponding TOF camera apparatus comprises a modulation device for producing a modulation signal. The modulation device in turn is connected to the transmitter and modulates the light signal to be transmitted. For example, the modulated modulation signal has a low frequency as compared to the light frequency (generally, infrared light is used here) in order to make measurement of a phase shift easier or possible in the first place. The determination of the phase difference can be performed, for example, via a correlation.

To evaluate the light detected by the receiver, an evaluation device is provided which is connected to the modulation device to tap off the modulation signal here for evaluating and determining the distance.

In principle, the TOF camera apparatus can comprise the entire camera. Alternatively, it can comprise merely the aforementioned components such as transmitter, receiver, modulation device and evaluation device, which can also be implemented and combined in a single chip, if required.

The TOF camera apparatus according to the present invention comprises a pixel matrix generally having an arrangement of at least two pixels. In a special case, the pixel matrix may also have merely a single pixel, for example, where the intention is to only receive light, without resolution of an image being of importance.

The TOF camera apparatus according to the present invention is advantageously characterized in that a check apparatus for error detection in at least one of the pixels is provided. In other words, checking goes beyond performing a general test as to whether the electronic system is able to function, in principle, whether signals can be received in the first place, or whether the optical components detect, for example, in the wavelength range that is suitable for monitoring (for example, in the infrared range). Rather, individual pixels or groups of pixels can be checked as to whether or not they make possible reliable reception. With this measure, it is possible, in particular, to detect errors that cannot be noticed, or be noticed only with difficulty, using conventional test methods. Moreover, it is possible when testing to target different typical errors, such as error functions in the dynamic recognition of objects which otherwise remain hidden but are safety-relevant to a particular extent.

In particular, the following types of errors can occur, in principle, which can represent a high risk in terms of safety in connection with dynamic recognition, especially in vehicles of all types:

- repeatedly, individual pixels or groups of pixels "stick," that is to say that, despite a change within their detection region (for example, appearance or disappearance of objects, changes in positions), these pixels provide an unchanging output value or an unchanging output vector of signals. Such an error can have the result that at least parts of the monitored region cannot be monitored permanently or at all for a specific time period. Especially in connection with vehicles, collisions are consequently also possible.
- Furthermore, errors in connection with the distance resolution can occur in individual pixels or groups of pixels. When considering the output of such pixels, it is possible to ascertain a "jump," that is to say the distance values do not change continuously or in small increments that are suitable for the expected resolution, but they change in larger increments, the result of which, for example, is the risk that an approaching object can no longer be recognized in time.
- Problems in connection with monitoring a region can also occur when individual pixels cannot at that moment establish an object in the monitoring region and it is therefore unclear whether these pixels function incorrectly and therefore do not recognize an object, or whether these pixels function correctly and indeed no object is currently located in the corresponding monitoring region.
- Moreover, errors in connection with addressing can occur. For example, it is conceivable that some lines in a pixel matrix are read more than once, while others are not read. Such an error, in principle, reduces the resolution, which means smaller objects may no longer be able to be detected.

To recognize such errors, it is generally not sufficient to check whether a general signal transmission within the electronic system occurs or whether or not optical detection by the receiver is possible, in principle. The present invention therefore proposes improved, more thorough error detection with which individual pixels or groups of pixels must be examined in more detail in this respect.

In an advantageous refinement of the present invention, the check apparatus comprises a test apparatus for performing a test operation and uses in this connection a checkable delay line. The test apparatus correspondingly checks the delay line so as to pass on the modulation signal in time-delayed fashion to a transmitter or to the evaluation device. In this way, the check apparatus can perform, using the test apparatus, a distance simulation for at least one pixel, all the way to each of the pixels, in order to check which distance value is determined by the corresponding pixel.

For example, if the error occurs that a pixel "sticks," it is possible to establish in the case of such an interrogation whether or not the pixel can also provide different distance values. If a delay line is interconnected when transmitting the modulation signal to the transmitter or to the evaluation device, the delay line influences the result in terms of how great the time delay is with which the signals each arrive in the evaluation device. In this way, it is possible, in principle, not only to perform calibration of the TOF camera apparatus, because due to the interconnected delay line the determined distance value is likewise changed, but it is possible with respect to individual pixels to simulate that the distance of the detected objects change or that there is an object at a specific distance.

The check apparatus and/or the test apparatus can be integrated in the TOF camera apparatus or form a separate module and be connected to the TOF camera apparatus, for example, via an interface. The delay lines can, in principle, be part of the check and/or test apparatus. In a preferred refinement of the present invention, the delay lines are integrated in the TOF camera apparatus or in the camera chip, which means that the modulation signal which is time-delayed by way of the delay lines does not need to be diverted and guided out of the actual camera module. In addition, the TOF camera apparatus can also be coupled to a calibration apparatus or contain the latter, by way of which distance calibration is performed by setting a delay time of the modulation signal by way of the delay lines.

First, the delay line can be installed in the transmission path between modulation device and transmitter. Next, the modulation signal is guided by the modulation device to the evaluation device still without additional delay line. That means that the signal transmitted by way of the transmitter does not only experience a delay due to the propagation time of the light signal, but is deliberately delayed by the interconnected delay line, that is to say the signal is already delayed before it even arrives at the transmitter. The greater the delay due to the interconnected delay line is, the greater is the distance value that is ultimately determined by this method.

Conversely, the delay line can also be interconnected between modulation device and evaluation device. The result of this in turn is that the determined distance value is reduced, because the evaluation device assumes that the modulation signal was produced at a later time. In fact, however, the modulation signal in such a case generally arrives at the transmitter earlier than it was made available to the evaluation device. In particular, it is conceivable that corresponding delay lines are interconnected in connection with an embodiment in both paths, specifically the path of the modulation signal between modulation device and transmitter and the path between modulation device and evaluation device or receiver. The sign of the delay can be changed depending on whether the delay line is connected upstream of the input of the transmitter or of the evaluation device or of the receiver. This is because, if delay lines are connected both upstream of the transmitter and also upstream of the evaluation device or the receiver, the total region over which distance values can be varied can be expanded.

In an advantageous development of the present invention, the delay line has at least two series-connected partial delay lines and furthermore a selection unit which taps off the modulation signal at the output of each of the partial delay lines with the result that the test apparatus that is connected to the selection unit can select between different time-delayed modulation signals. In this way, the different time delays and the different path lengths the modulation signal must travel can be realized in a comparatively compact design. Furthermore, switching between different time delays by way of simple switching methods or the different tapping off of the signal at different locations is possible.

In an advantageous embodiment of the present invention, the partial delay lines can in each case be embodied in the form of digital buffers. These make possible a very defined and precise delay of the corresponding signal.

In an exemplary embodiment of the present invention, the partial delay lines can in each case be embodied in the form of digital buffers, with the result that defined delays are made possible by way of standardized components and can simplify the manufacturing process.

In principle, the test apparatus can be embodied for analog or digital checking of the delay line and can in this way be adapted, in principle, to different design types of a camera.

However, it is also possible to design the delay line such that the delay times that can be realized thereby are not limited to (a few) discrete values, but can be varied continuously.

A delay in a line can be achieved by way of an electronic component that delays the signal by a predefined time period being installed in the line. In particular, in an embodiment of the present invention, the delay line and/or the partial delay lines can also be changed variably. This can be accomplished, for example, by way of the delay line having at least one digital counter which operates with a clock frequency and can be controlled by way of the clock. Such clock frequencies can, in particular, be at least 2 GHz. In this way, very precise setting of the time delay can be performed.

The check apparatus or the test apparatus subsequently performs a distance simulation or a variation of the distance value for the pixel or pixels and also reads the output value to check which distance values were determined by the corresponding pixel. The check apparatus can consequently compare whether the output distance value corresponds to, or sufficiently corresponds to, the distance value specified by the simulation and the corresponding pixel is thus able, in principle, to measure distance values with sufficient precision.

If the pixel "sticks," it provides a constant value at the output independently of the simulated distance value, which means that it is, in particular, not only possible to detect that an error is present and that the corresponding pixel detects incorrectly, but the error can also be identified, in particular, with respect to its type (for example, a pixel that sticks) or its cause. The same is true if the corresponding pixel provides output distances which exhibit unchecked jumps. In both cases, the received signal or the detected signal can be passed on in time-delayed fashion via the delay line, that is to say the ascertained distance value is changed and varied in a manner specified by the check apparatus. Since the check apparatus specifies the amount and/or sign by which the distance value is varied, this also indicates whether or not a corresponding error is present.

If a pixel does not detect an object or at least it appears that a pixel does not detect an object, which practically means that a viewing direction to infinity is present (no object within the field of view), the pixel consequently also does not provide a distance value. Consequently, it is initially not possible either to vary a distance value via a delay line. In order to nevertheless discover whether there is indeed no object in the field of view, a type of virtual object with a specified distance must be produced or simulated. For this purpose, what is referred to as a fill-and-spill method can be implemented and used. In this method, a specified amount of charge is induced in one or more pixels in a targeted fashion by applying a corresponding electrical signal or control voltage. For example, this signal can be applied at the pixel itself at the store gates, at which typically the photo induced charge carriers, divided according to modulation frequency, or, in principle, also at the floating diffusions, at which the detected amount of charge carriers is determined. The pixel then does not differentiate whether the corresponding charge is photo induced, that is to say brought about by received light, or is brought about in targeted fashion by the previously mentioned electrical signal. It is then possible to compare whether or not the distance value that was produced in the fill-and-spill method by way of the applied electrical signal matches the expected distance value.

It is furthermore possible to vary the distance value additionally using a delay line to even further improve the error detection possibilities.

By using an apparatus for applying a control voltage or simulation voltage or by using the fill-and-spill method in connection with this test, it is thus also advantageously possible to check a correct function of pixels when the established symptoms (in the present case: no object or object at infinite distance) do not permit for any conclusion as to whether an error has indeed occurred to be drawn.

In principle, a fill-and-spill method can generally also be used to improve the signal-to-noise ratio by filling the store gates to a specific level by way of the specified electrical signal being applied, with the result that only further photo induced charge carriers can flow from the store gate and contribute to the measurement.

Moreover, provision may be made in an embodiment variant of the present invention of an addressing apparatus for addressing the pixels of the pixel matrix, wherein the check apparatus comprises a read-back device for reading the pixels and checking the read content thereof. It is possible in this way to compare whether the correct pixels which should be addressed with the corresponding addressing are indeed read or others. If an addressing error arises, frequently the problem has occurred that individual lines or columns of a pixel matrix are not actuated while frequently additionally, for example, other lines or columns are actuated more than once instead. Overall, the resolution of the camera thus becomes worse and specific regions of the monitoring region or of the field of view are no longer detected because the associated pixels continue to be omitted due to incorrect addressing or incorrect reading.

Consequently, a method according to the present invention for error recognition in a TOF camera apparatus is characterized in that error recognition in the pixel or in at least one of the pixels is performed, as a result of which the advantages which were already mentioned in connection with the TOF camera apparatus according to the present invention and the exemplary embodiments thereof can be attained. Primarily, the method according to the present invention can offer an increased measure of safety, in particular, if the underlying TOF camera apparatus is used as part of a driver assistance system or for other steering or navigation purposes.

In such a method, it is advantageously possible in an exemplary embodiment for a delay line to be correspondingly used to vary distance values and to check whether the latter correspond to the expected distance values. Further conceivable is a development using a fill-and-spill method, where a charge carrier amount which corresponds to the detection of an object at a specific distance is induced by applying a control voltage to one or more pixels. It is possible in this way to check whether the pixel functions incorrectly and fails to recognize objects or whether there is indeed no object within the field of view. It is additionally possible in the exemplary embodiment to check by way of addressing and back-reading individual pixels whether indeed all pixels are read and the association of the read outputs and the addressed pixels is correct.

BRIEF DESCRIPTION OF THE DRAWINGS

Exemplary embodiments of the present invention will be illustrated in the drawings and explained in more detail below with specification of further details and advantages.

DETAILED DESCRIPTION OF THE INVENTION

Figure 1:
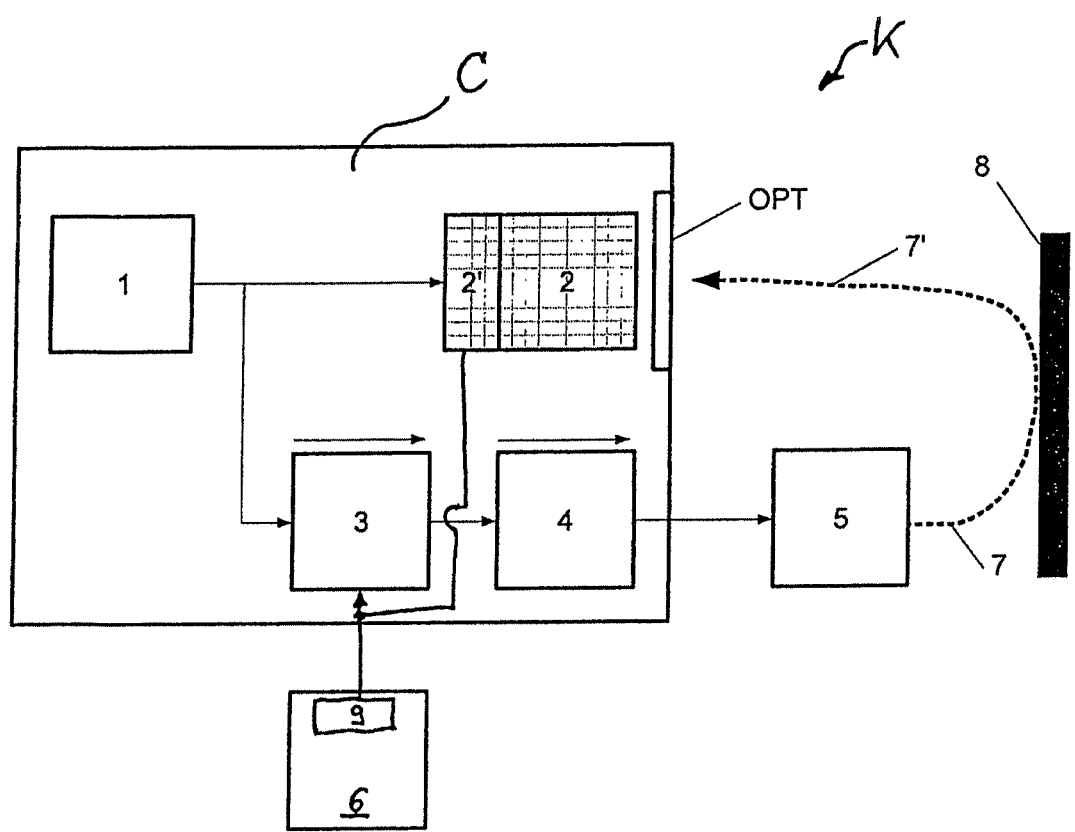
FIG. 1 shows a schematic illustration of a TOF camera apparatus according to the present invention with a delay line.

FIG. 1 shows a TOF camera apparatus K according to the present invention having a modulation device 1, which produces a modulation signal. This modulation signal is guided first directly to an evaluation device 2', which is in direct contact with a receiver 2 in the form of a pixel field. Moreover, the modulation signal is passed to a delay line 3, which sends the signal, if appropriate, in time-delayed fashion and passes it on to an illumination driver 4. The illumination driver 4 in turn passes its signal to an illumination unit 5, which can take the form of a laser or of a light-emitting diode, for example. The delay line 3 is checked via the interface I by a check apparatus 6 as a superordinate monitoring system. More accurately, the check apparatus 6 specifically also comprises a test apparatus 9, which checks the delay line 3, which is also connected to the evaluation device 2' via the interface I, so as to check the ultimately determined distance value. The transmitted light 7 is incident on an object 8, is scattered, and passes along the path 7' into the camera or the pixel matrix 2 and is detected here.

Connected upstream of the receiver 2 in the beam path is a receiving optical unit OPT. Delay line 3 and check apparatus 6 can, in principle, also be implemented together in a structural unit or a module.

The embodiment according to FIG. 1 offers the advantage that the check apparatus 6 for error detection can be docked if necessary via the interface I and does not need to be readily integrated permanently in the structural unit. In the present case, modulation device 1, receiver 2, evaluation device 2', delay line 3, illumination driver 4 are integrated with the optical unit OPT on a chip C. The delay line 3 can certainly be implemented in the structural unit, in the present case even on the chip C, with the result that the modulation signal does not need to be guided out of the structural unit, for example, via the interface. In addition, the delay line can also be used for calibration to perform a calibration of the distance values ascertained and output by the TOF camera apparatus.

The camera apparatus K comprises at least the modulation device 1, the illumination driver 4 and the illumination 5, the receiver in the form of a pixel field 2 and the evaluation device 2'.

The check apparatus 6 can be undocked from the interface I. The TOF camera apparatus K can subsequently be used in monitoring operation. If calibration is necessary, a calibration apparatus can be coupled thereto via the interface I to check the delay line 3 and set the time delay with which the modulation signal is delayed so as to set the result distance value.

Figure 2:
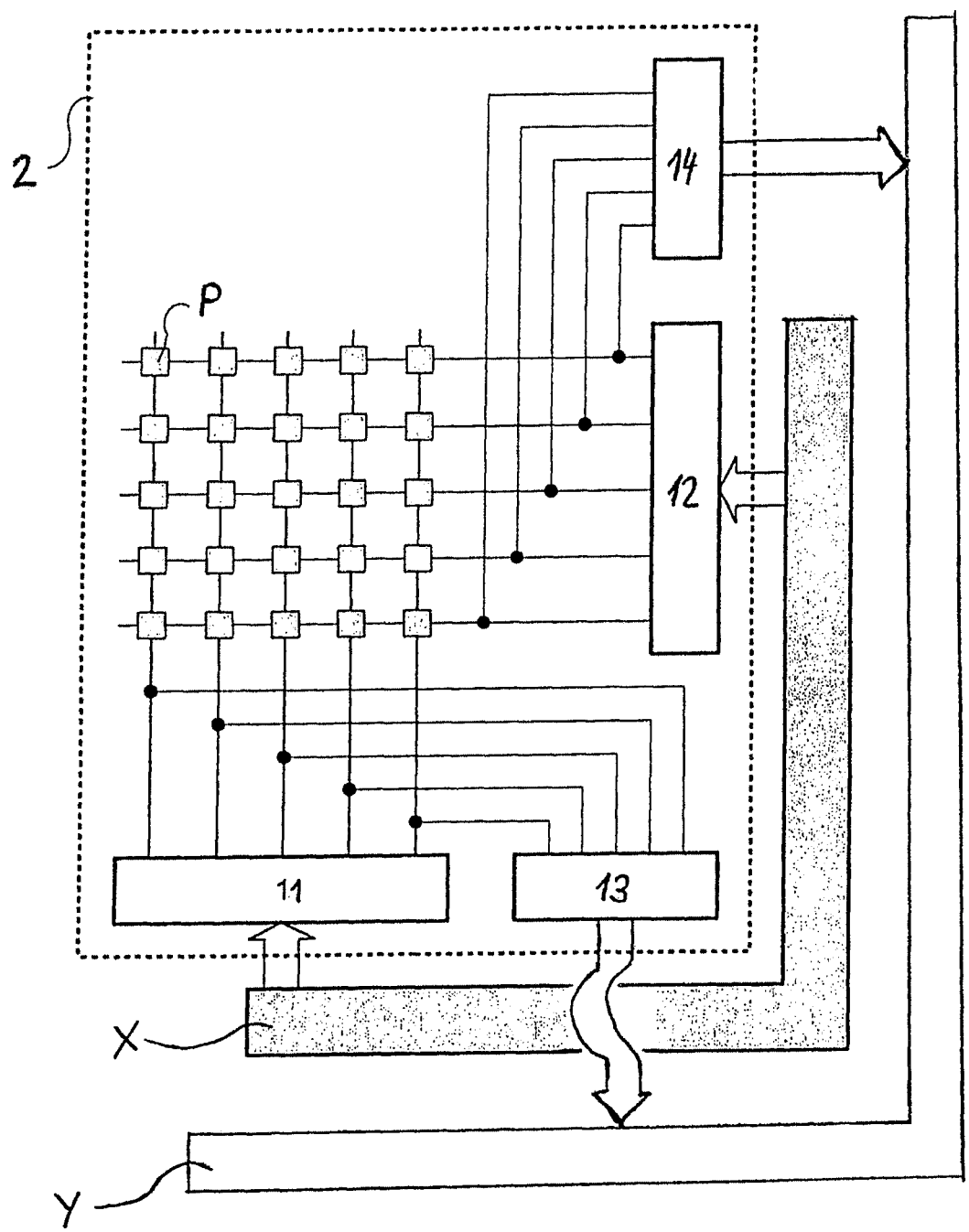
FIG. 2 shows a schematic illustration of a TOF camera apparatus according to the present invention with an addressing and read-back device.

FIG. 2 schematically illustrates how an addressing and read-back check for testing the addressing can be implemented in the TOF camera apparatus K. The pixels P of the pixel matrix 2 can each be actuated via a column addresser 11 and a line addresser 12. Addressing is initiated via the check apparatus 6 via the addressing bus x. Furthermore, a read-back device 13, 14 for reading the lines and columns is connected in each case to each of the pixels P. Both read-back devices 13, 14 are in turn connected to the read-back bus y and consequently also to the test apparatus 6, with the result that read values can be adjusted here. The structural unit of the pixel matrix 2 can be implemented on the chip C as part of the TOF camera apparatus K.

Figure 3:
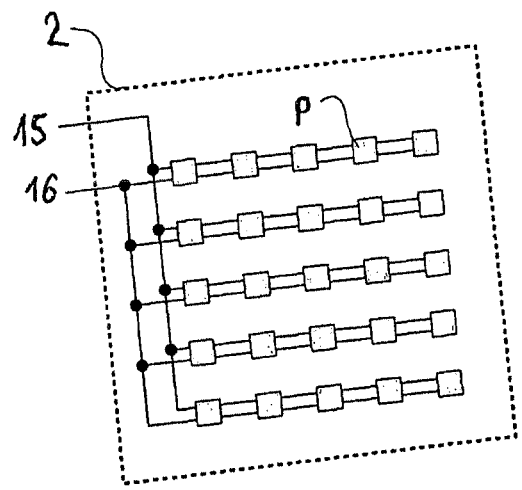
FIG. 3 shows a schematic illustration of the fill-and-spill method for a TOF camera apparatus according to the present invention.

The pixel field 2 in FIG. 3 shows a matrix arrangement of individual pixels P, which are connected in line-wise fashion to control voltage lines 15, 16 to apply a stimulation voltage to the pixels so as to simulate an object.

Figure 4:
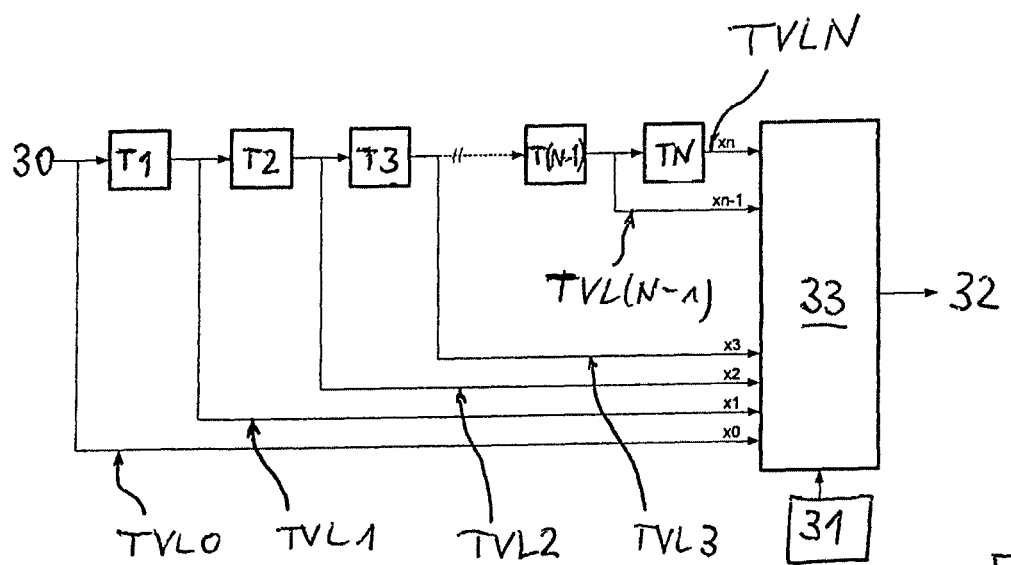
FIG. 4 shows a schematic illustration of a digital delay line for a TOF camera apparatus according to the present invention.

FIG. 4 in turn describes a refinement of a delay line VL with different delay stages T1, T2, T3, . . . TN, which are connected in series. The modulation signal is input via the input 30. In principle, it may pass through all series-connected delay stages T1, T2, . . . , TN. Located upstream of the delay stages and downstream of each delay stage is a branching-off node which makes it possible to tap off the modulation signal at the corresponding location. In this way, the corresponding partial delay lines TVL0, TVL1, TVL2, . . . TVLN are formed. The more delay stages T1, T2, . . . TN the signal has passed through, the more it is time-delayed. All branches finally lead to a selection unit 31, which is embodied for example, in the form of a multiplexer. The output 32 of the multiplexer 33 then provides the generally delayed modulation signal. The individual delay stages T1, T2, . . . TN may be embodied in the form of digital buffers, wherein the input signal 30 is already present in digital form. In the branching-off line TVL0, the signal is only or at most delayed by the multiplexer 33, while the line TVLN means that all delay stages have been exhausted and the signal has been maximally delayed.

All exemplary embodiments and developments of the present invention have in common is that it is possible to perform improved error detection in a TOF camera apparatus by providing a check apparatus for at least one or a plurality of or all pixels. This makes it possible, in particular, to detect errors and to be able to differentiate detection errors and correct operation of pixels in the case of the same symptoms, wherein types of errors can also be made detectable and differentiable, for example, if the intention is to determine whether:
a pixel "sticks,"
the output values in pixels "jump,"
a setting of the field of view to infinity is present, or
pixels are incorrectly addressed.

LIST OF REFERENCE SIGNS

1 Modulation device
2 Pixel matrix
2' Evaluation device
3 Delay line
4 Illumination driver
5 Illumination
6 Check apparatus
7 Output beam
7' Scattered-back light
8 Object
9 Test apparatus
11 Column addresser
12 Line addresser
13 Column read-back device
14 Line read-back device
15 Control voltage line
16 Control voltage line
30 Input
31 Selection unit
32 Output
33 Multiplexer
C Chip
K TOF camera apparatus
OPT Receiving optical unit
P Pixel
I Interface
T1, T2, . . . TN Delay stages
TVL0, TVL1, TVL2, . . . TVLN Partial delay lines
x Addressing bus
y Read-back bus

The invention claimed is:
1. A TOF camera apparatus for transmitting light signals and recording the light that is scattered back at an object and also for determining the distance of the TOF camera apparatus from the object, wherein the TOF camera apparatus comprises:
a transmitter for transmitting light signals,
a receiver for detecting the light scattered back at the object, embodied in the form of a pixel matrix having at least one pixel,
a modulation device for producing a modulation signal, wherein the modulation device is connected to the transmitter to modulate light signals that are to be transmitted by the transmitter,
an evaluation device, which is connected to the receiver, for evaluating the light detected by the receiver, with the evaluation device connected to the modulation device to obtain the modulation signal for evaluating and determining the distance,
a check apparatus having a test apparatus for error detection in at least one pixel, and
only a single delay line that is checkable by the test apparatus, wherein the modulation device is directly connected to the evaluation device and an input of the single delay line, an output of the single delay line is connected to the transmitter and the single delay line is connected to the evaluation device via a connection line therebetween, and the test apparatus is directly connected to the connection line between the evaluation unit and the single delay line such that the test apparatus is embodied to pass a modulated signal with a time delay from the single delay line to the transmitter and/or the evaluation unit.

2. The TOF camera apparatus according to claim 1, wherein the check apparatus performs by way of the test apparatus a distance simulation and/or a distance variation for at least one pixel in order to check which distance value is determined by the corresponding pixel.

3. The TOF camera apparatus according to claim 1, further comprising an addressing apparatus for addressing the pixels of the pixel matrix and the check apparatus comprises a read-back device to read the pixels and check the read content thereof.

4. The TOF camera apparatus according to claim 3, wherein the check apparatus actuates the addressing apparatus to address each of the pixels.

5. The TOF camera apparatus according to claim 1, wherein the check apparatus comprises an apparatus for applying a control voltage to at least one pixel in order to effect a specific charge injection by applying the control voltage as stimulation voltage instead of charge carriers which are photoinduced by received light, and for reading the at least one pixel and for checking the read content thereof, wherein the apparatus for applying and/or reading the control voltage is connected to the pixel matrix to simulate an object to be detected at a specific distance and/or check the distance from said simulated object, which is specified by the charge injection.

6. The TOF camera apparatus according to claim 1, wherein the check apparatus varies the distance of the object which is simulated by applying a control voltage to at least one pixel that corresponds to the object being detected at a specific distance by checking the single delay line and which distance value is determined by the corresponding pixel.

7. The TOF camera apparatus according to claim 1, wherein the single delay line has at least two series-connected partial delay lines and an evaluation unit is provided, which taps off the modulation signal at the output of each of the partial delay lines, with the result being that the test apparatus connected to the evaluation unit can select between different time-delayed modulation signals.

8. The TOF camera apparatus according to claim 7, wherein the partial delay lines are digital buffers and/or wherein the single delay line has at least one digital counter having a clock frequency of at least two gigahertz.

9. The TOF camera apparatus according to claim 1, wherein the single delay line has an analog delay device and/or wherein the test apparatus is embodied for analog or digital checking of the single delay line.

10. The TOF camera apparatus according to claim 1, wherein the check apparatus:

detects an interruption in the readiness of at least one of the pixels by way of the check apparatus performing a distance simulation and/or a distance variation for each of the pixels by way of the test apparatus to check which distance value is determined by the corresponding pixel, and/or detects a distance resolution problem of at least one of the pixels by way of the check apparatus performing a distance simulation for each of the pixels by way of the test apparatus to check which distance value is determined by the corresponding pixel, and/or detects the absence of an object to be detected by way of the check apparatus performing a distance simulation by applying a voltage to at least one, in particular each of the pixels by way of the test apparatus to check which distance value is determined by the corresponding pixel, and/or detects an addressing error of at least one of the pixels by way of the check apparatus performing a distance simulation for each of the pixels by way of the test apparatus to check which distance value is determined by the corresponding pixel.

11. A method for error detection in at least one pixel of a pixel matrix having at least two pixels, wherein the method is used in a TOF camera apparatus for transmitting light signals and receiving the light that is scattered back at an object and for determining the distance of the TOF camera apparatus from the object, wherein the TOF camera comprises: a transmitter; a receiver embodied in the form of the at least one pixel of the matrix having the at least two pixels; a modulation device; an evaluation device that is connected to the receiver; a check apparatus having a test apparatus for error detection in the at least one pixel; and only a single delay line that is checkable by the test apparatus, wherein the modulation device is directly connected to the evaluation device and an input of the single delay line, an output of the single delay line is connected to the transmitter and the single delay line is connected to the evaluation device via a connection line therebetween, and the test apparatus is directly connected to the connection line between the evaluation unit and the single delay line such that the test apparatus is embodied to pass a modulated signal with a time delay from the single delay line to the transmitter and/or the evaluation unit, the method comprising:

using the transmitter for transmitting light signals, using the pixel matrix as the receiver for detecting the light that is scattered back at the object, using the modulation device for producing a modulation signal, wherein the modulation device is connected to the transmitter to modulate light signals that are to be transmitted by the transmitter, and using the evaluation device for evaluating the light detected by the receiver, with the evaluation device being connected to the modulation device to obtain the modulation signal for evaluating and determining the distance, wherein an error detection is performed in at least one of the pixels.

12. The method according to claim 11, wherein, for error detection, a distance simulation and/or distance variation for each of the pixels is performed to check which distance value is determined by the corresponding pixel by way of the modulation signal being passed on in time-delayed fashion to the transmitter and/or to the evaluation device and by performing a check as to which distance value is determined by the corresponding pixel.

13. The method according to claim 11, wherein, for error detection, at least one of the pixels is addressed and read back and thus a check is performed as to whether the actually addressed pixel or pixels have been read.

14. The method according to claim 11, wherein, for error detection, a specific charge injection is performed by applying a simulation voltage to each of the pixels instead of charge carriers which are photoinduced by received light and reading the corresponding pixel or pixels that simulate an object to be detected checking a distance value, specified by the charge injection, from said simulated object, wherein the distance value of said simulated object is varied and checked by way of a time delay of the modulation signal.

15. The TOF camera apparatus according to claim 1, wherein the check apparatus provides error detection in each of the pixels.

16. The TOF camera apparatus according to claim 1, wherein the single delay line is connected between the output of the modulation device at which the modulation signal can be made available and the input of the transmitter for receiving the modulation signal and/or the input of the evaluation device for receiving the modulation signal.

17. The TOF camera apparatus according to claim 2, wherein the check apparatus performs by way of the test apparatus a distance simulation and/or a distance variation for each of the pixels.

18. The TOF camera apparatus according to claim 5, wherein the control voltage is applied to each of the pixels.

\* \* \* \* \*